(12) United States Patent
Jiang et al.

(10) Patent No.: US 11,748,053 B2
(45) Date of Patent: Sep. 5, 2023

(54) DEVICE AND METHOD FOR ROBOTIC PROCESS AUTOMATION OF MULTIPLE ELECTRONIC COMPUTING DEVICES

(71) Applicant: ISCOOLLAB CO., LTD., Taipei (TW)

(72) Inventors: Yan-Mei Jiang, Taipei (TW); Han-Yi Tsai, Taipei (TW); Zi-Han Li, Taipei (TW)

(73) Assignee: IsCoolLab Co., Ltd., Taipei (TW)

( * ) Notice: Subject to any disclaimer, the term of this patent is extended or adjusted under 35 U.S.C. 154(b) by 0 days.

(21) Appl. No.: 17/405,019

(22) Filed: Aug. 17, 2021

(65) Prior Publication Data
US 2022/0283769 A1 Sep. 8, 2022

(30) Foreign Application Priority Data
Mar. 2, 2021 (TW) .................. 110107308

(51) Int. Cl.
G06F 3/0482 (2013.01)
G06F 3/14 (2006.01)
G05B 19/042 (2006.01)

(52) U.S. Cl.
CPC ......... G06F 3/1454 (2013.01); G05B 19/042 (2013.01); G06F 3/0482 (2013.01)

(58) Field of Classification Search
CPC .... G06F 3/1454; G06F 3/0482; G05B 19/042
See application file for complete search history.

(56) References Cited

U.S. PATENT DOCUMENTS 10,488,857 B2 11/2019 Duffley et al.
10,911,546 B1* 2/2021 Goswami ............... H04L 67/141
2009/0037024 A1 2/2009 Jamieson et al.
2012/0290121 A1* 11/2012 Gronbach ............... G10L 15/22
700/180
2013/0211592 A1* 8/2013 Kim ........................ G06F 3/017
700/258
2018/0242806 A1 8/2018 Haegermarck
(Continued)

FOREIGN PATENT DOCUMENTS

CN 103900583 A 7/2014
EP 3112965 A1 4/2017
TW 202107418 A 2/2021

OTHER PUBLICATIONS

Office Action to the corresponding Taiwan Patent Application rendered by the Taiwan Intellectual Property Office (TIPO) dated Sep. 23, 2021, 16 pages (including English translation).

Primary Examiner — Michael W Choi
(74) Attorney, Agent, or Firm — Skaar Ulbrich Macari, P.A.

(57) ABSTRACT

A device and a method for robotic process automation of multiple electronic computing devices are disclosed. The device creates and stores a script that records at least an event relating to a first device and at least one action corresponding to the event. The device continuously receives a current screenshot image of a first device, and continuously analyzes the current screenshot image of the first device according to the script so as to determine whether the event has occurred. When determining that the event has occurred, the device generates at least one control signal corresponding to the at least one action according to the script, and transmits the at least one control signal to a second device, so as to perform the at least one action for the second device.

12 Claims, 4 Drawing Sheets

(56) References Cited

U.S. PATENT DOCUMENTS

| | | |
|---|---|---|
| 2018/0284709 A1 | 10/2018 | Dubey et al. |
| 2018/0329399 A1 | 11/2018 | Neelakandan et al. |
| 2020/0171667 A1* | 6/2020 | Anderson .............. B25J 9/1697 |
| 2021/0109722 A1* | 4/2021 | Ripa ................... G06F 3/04847 |
| 2021/0342216 A1* | 11/2021 | Dines .................. G06F 11/0772 |
| 2021/0342623 A1* | 11/2021 | Skarda ................... G06V 20/41 |

* cited by examiner

DEVICE AND METHOD FOR ROBOTIC PROCESS AUTOMATION OF MULTIPLE ELECTRONIC COMPUTING DEVICES

PRIORITY

This application claims priority to Taiwan Patent Application No. 110107308 filed on Mar. 2, 2021, which is incorporated herein by reference in its entirety.

FIELD

The present disclosure relates to a device and a method for the robotic process automation. More specifically, the present disclosure relates to a device and a method for the RPA of multiple electronic computing devices.

BACKGROUND

Robotic Process Automation (RPA) is an automated method that simulates the user's operating behavior on an electronic device through software programming, and then assists or replaces the user in operating the electronic device. The RPA is quite suitable to be used in working environments that often need to perform the same or similar operations repeatedly, such as industrial production environments that contain various production equipment. However, conventional RPA devices can only automate processes for a single device, and cannot integrate software or operating systems in different devices. In addition, due to the concerns of information security, the equipment in the industrial production environment are usually restricted from connecting to the Internet. This also causes the equipment in the industrial production environment to only be automated by its dedicated RPA device, and it is impossible to implement multi-machine automation with a single RPA device. In view of this, how to design an RPA device for multiple electronic computing devices is indeed a technical problem that needs to be solved in the technical field of the present disclosure.

SUMMARY

To solve at least the aforementioned problem, the present disclosure provides a device for robotic process automation. The device may comprise a storage, a communication interface and a processor. The processor may be electrically connected with the storage and the communication interface. The storage may be configured to store a script, and the script may record at least an event corresponding to a first device, and at least one action corresponding to the event. The communication interface may be coupled with the first device and a second device, and may be configured to continuously receive a current screenshot image of the first device. The processor may be configured to create the script, and continuously analyze the current screenshot image of the first device according to the script so as to determine whether the event has occurred. The processor may be further configured to generate at least one control signal corresponding to the at least one action according to the script when determining that the event has occurred. The communication interface may be further configured to transmit the at least one control signal to the second device so as to perform the at least one action for the second device.

To solve at least the aforementioned problem, the present disclosure further provides a method for robotic process automation. The method may be executed by an electronic computing device. The electronic computing device stores a script and at least one action, the script recording at least an event corresponding to a first device, the at least one action corresponding to the event. The method in certain embodiments may comprise:

continuously receiving a current screenshot image of the first device;

creating the script;

continuously analyzing the current screenshot image of the first device according to the script so as to determine whether the event has occurred; and generating at least one control signal corresponding to the at least one action according to the script, and transmitting the at least one control signal to a second device, so as to perform the at least one action for the second device.

Based on the above, the device and method for RPA provided by the present disclosure perform non-invasive event determination by analyzing screenshot images, and integrate simultaneous operation process between the first device and the second device through scripts such that when an event involving the first device occurs, at least one action corresponding to the event is executed on the second device accordingly, thereby achieving the cross-device RPA. Therefore, the device and method for RPA provided by the present disclosure indeed solve the above-mentioned problems in the technical field of the present disclosure.

The aforesaid content is not intended to limit the present invention, but merely provides preliminary profile of the present invention to people having ordinary skill in the art. People having ordinary skill in the art can understand the details of the present invention according to the attached drawings and the embodiments recited in the following detailed description.

BRIEF DESCRIPTION OF THE DRAWINGS

The appended drawings may assist the understanding of the various embodiments of the present invention, wherein.

DETAILED DESCRIPTION

Figure 1:
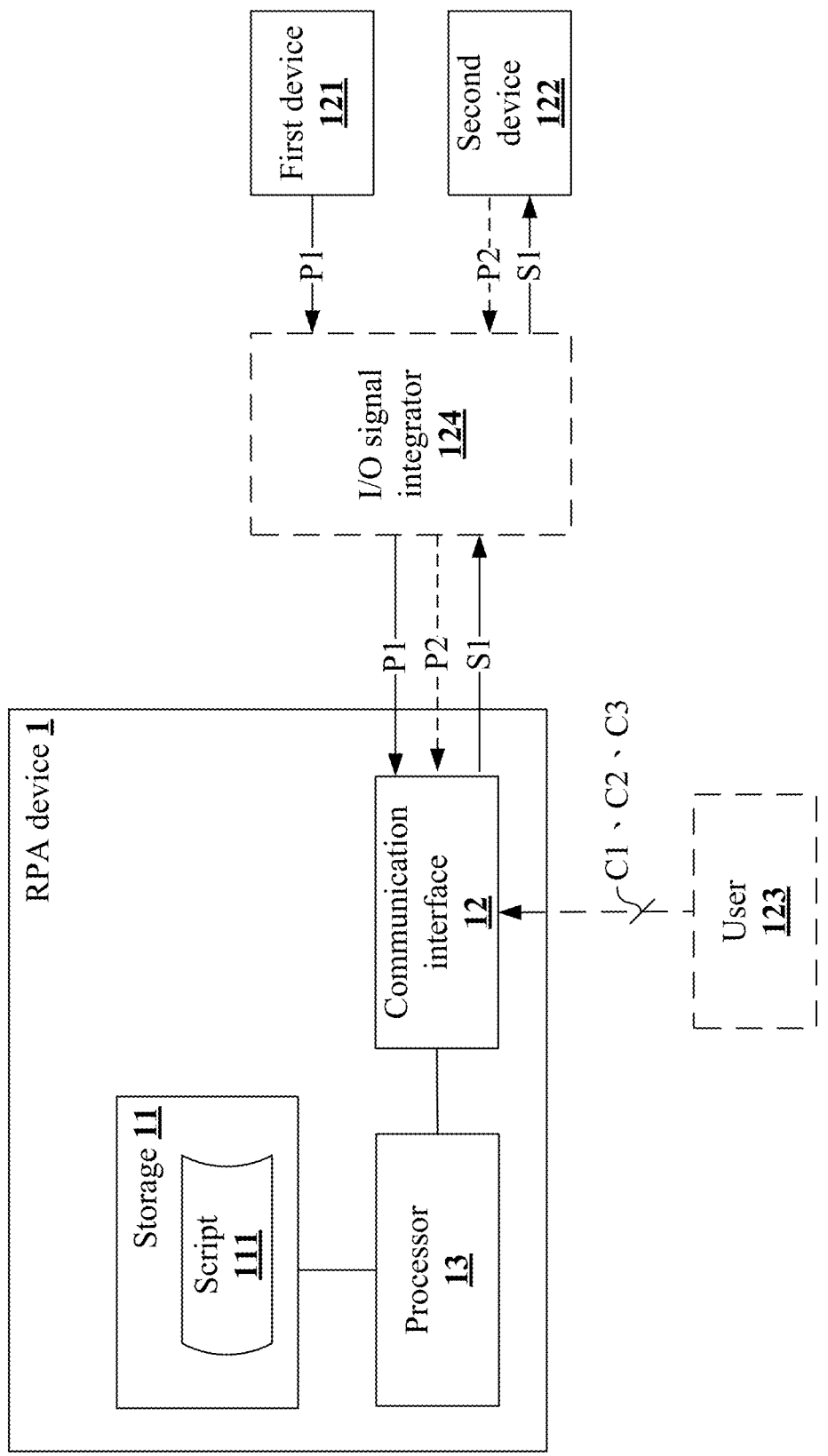
FIG. 1 depicts a device for RPA according to one or more embodiments of the present disclosure.

Hereinafter, the present invention will be described through a number of example embodiments, but these example embodiments are not intended to limit the present invention to only be implemented according to the operation, environment, application, structure, process, or steps recited therein. For ease of description, contents not directly related to the embodiment of the present invention or contents that can be understood without specific descriptions will be omitted in this text and the drawings. In the drawings, the size of each element and the ratio between each element are only examples, and are not for limiting the present invention. In the following content, the same (or similar) reference numbers may correspond to the same (or similar) components, except for those that are specially described. On the premise that it can be implemented, the quantity of each element described below may be one or more, unless otherwise specified.

FIG. 1 depicts a device for RPA according to one or more embodiments of the present disclosure. The contents shown in FIG. 1 are merely for explaining the embodiments of the present invention instead of limiting the present invention.

Referring to FIG. 1, a device 1 for RPA (hereinafter also referred to as "RPA device 1") may basically comprise a storage 11, a communication interface 12 and a processor 13, and the processor 13 may be electrically connected with the storage 11 and the communication interface 12. Note that the electrical connection between the above elements may be direct (i.e., connected to each other through no other functional components) or indirect (i.e., connected to each other through other functional components). The RPA device 1 may be various electronic devices with computing capabilities, such as but not limited to: desktop computers, portable computers, smartphones, portable electronic accessories (glasses, watches, etc.) The RPA device 1 may achieve the RPA by executing a process defined in a script. The specific details will be described later.

The storage 11 may be used to store data generated by the RPA device 1, data transmitted to the RPA device 1 from an external device, or data input to the RPA device 1 by a user. The storage 11 may comprise various storage units provided in a general computing device/computer, so as to implement various corresponding functions described below. For example, the storage 11 may comprise a first-level memory (also called main memory or internal memory), and the processor 13 may directly read the instruction sets stored in the first-level memory and execute it when needed said instruction sets. The storage 11 may also comprise a second-level memory (also called an external memory or an auxiliary memory), which can transmit the stored data to the first-level memory through a data buffer. The secondary memory may be, for example, but not limited to: hard disk, optical disk, etc. The storage 11 may also comprise a third-level memory, i.e., a storage device that can be directly inserted into or removed from the computer, such as a portable hard drive or a cloud hard drive. The memory may be used to store a script 111, and the script 111 may record at least one event and at least one action corresponding to the event, the details of which will be further described later.

The communication interface 12 may be used to transmit and receive data with external devices and/or users. For example, the communication interface 12 may be coupled with a first device 121 and a second device 122, and may receive the current screenshot image P1 from the first device 121 and the current screenshot image P2 from the second device 122. In addition, the communication interface 12 may also transmit at least one control signal (e.g., the control signal S1) to the second device 122 to operate the second device 122. The first device 121 and the second device 122 may be target devices for RPA, which specifically may be, for example, but not limited to, the control computer for a production device in an industrial production environment (for example, but not limited to: a laser drilling machine for printed circuit boards (PCB), an automatic optical inspection (AOI) machine, a wafer prober, etc.) The current screenshot image P1 and the current screenshot image P2 may be the contents being displayed by the operating systems of the first device 121 and the second device 122, respectively. Said contents may vary over time, that is, the current screenshot image P1 or the current screenshot image P2 at different time points may be different images.

In some embodiments, the communication interface 12 may also receive an image-capturing command C1, an event-defining command C2, an action-assigning command C3, or the like from a user 123, the details of which will be described later. In some embodiments, the communication interface 12 may also be coupled with at least one input/output (I/O) signal integrator (e.g., an I/O signal integrator 124) to receive and/or transmit the aforementioned data or signals between the communication interface 12 and the first device 121, and the aforementioned data or signals between the communication interface 12 and the second device 122, through the at least one I/O signal integrator. The at least one I/O signal integrator may receive image data from the first device 121 and the second device 122 and at least one control signal from the communication interface 12 in a wired or wireless manner, and may provide integration and switching functions. The at least one I/O signal integrator may be, for example, but not limited to, a keyboard-video-mouse (KVM) switch. It should be clarified that the terms "first" and "second" used for the "devices" in the present disclosure are only used for labeling, and are not used for limiting their hierarchy or order.

In some embodiments, the communication interface 12 may be various I/O interfaces in a computing device/computer, such as but not limited to: a Universal Serial Bus (USB) interface, a Video Graphics Array (VGA) interface, a High Definition Multimedia Interface (HDMI), etc. In this case, the RPA device 1 may obtain the screenshot image of an external device through the communication interface 12 (e.g., the current screenshot image P1 of the first device 121 and the current screenshot image P2 of the second device 122, or the like). The RPA device 1 may also be connected with a mouse, a touchpad, a keyboard, a touch screen and other input devices through the communication interface 12, and then receive various commands from the user 123 (e.g., the image-capturing command C1, the event-defining command C2, the action-assigning command C3, or the like). In some embodiments, the communication interface 12 may also be electrically connected with a display, so as to present various image outputs of the RPA device 1 through the display.

In some embodiments, the communication interface 12 may be a transceiver, which may be used for wired or wireless communication with external devices. Regarding the wireless communication, the communication interface 12 may comprise, for example, but not limited to: antennas, amplifiers, modulators, demodulators, detectors, analog-to-digital converters, digital-to-analog converters and other communication elements. As for the wired communication, the communication interface 12 may be, for example, but not limited to: a gigabit Ethernet transceiver, a gigabit interface converter (GBIC), a small form-factor pluggable (SFP) transceiver, a ten-gigabit small form-factor pluggable (XFP) transceiver, etc. In this case, the communication interface 12 may form an internal/local network (not shown in the drawings) with an I/0 signal integrator electrically connected with the first device 121 and another I/O signal integrator electrically connected with the second device 122 to obtain the current screenshot image P1 of the first device 121 and the current screenshot image P2 of the second device 122 through the I/O signal integrators, and may transmit a control signal S1 to the second device 122. In addition, the communication interface 12 may also receive the aforementioned image-capturing command C1, event-defining command C2, action-assigning command C3 or the like from the user 13 through a wired or wireless manner.

The processor 13 may be a microprocessor or a microcontroller or the like with a signal processing function. A microprocessor or microcontroller is a special programmable integrated circuit, which has the capabilities of calculation, storage, output/input, etc., and can accept and process various coding instructions, so as to perform various logic operations and arithmetic operations, and output the corresponding calculation result. The processor 13 can be programmed to interpret various instructions and perform various calculation tasks or programs. The processor 13 may be used to create the script 111.

Figure 2A:
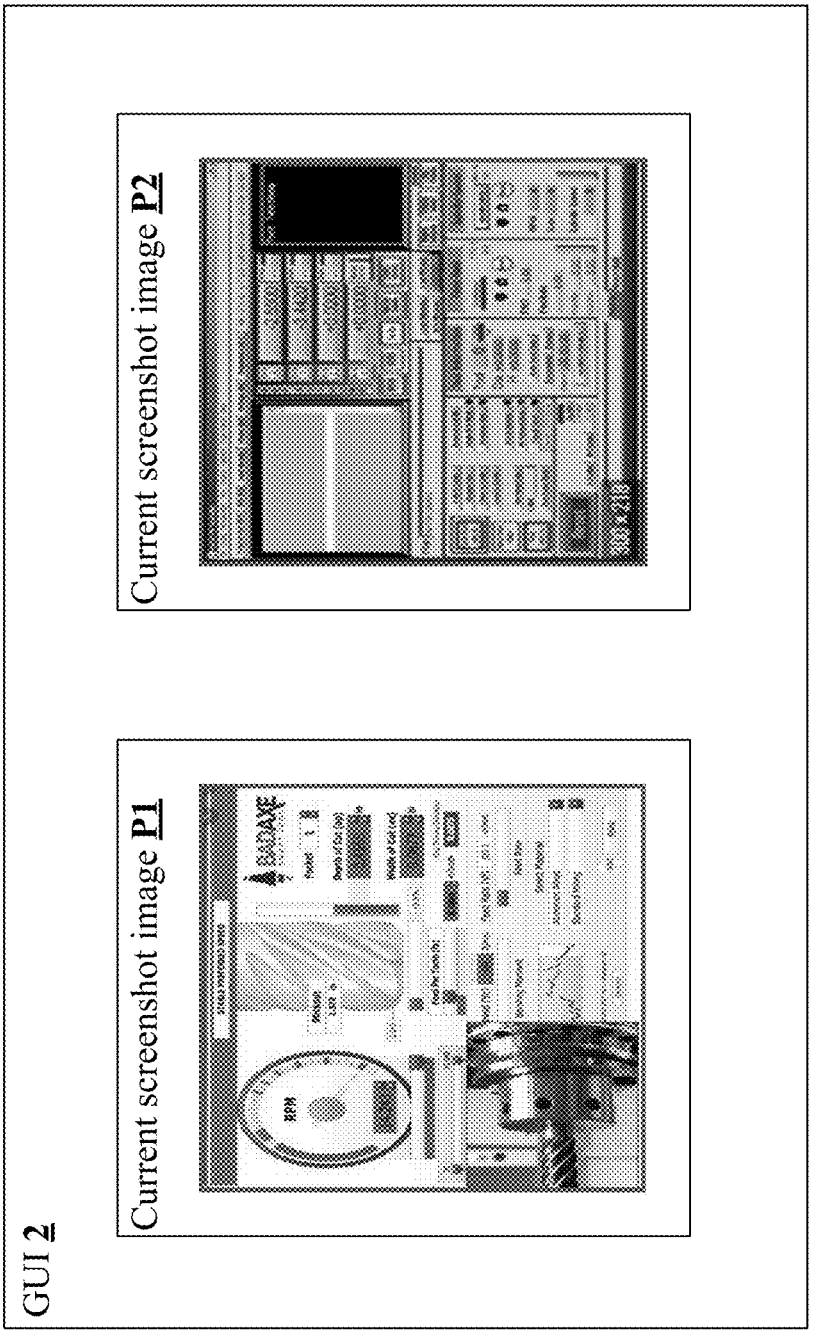
FIG. 2A and FIG. 2B depict the graphics user interface (GUI) created by the device for RPA according to one or more embodiments of the present invention.
Figure 2B:
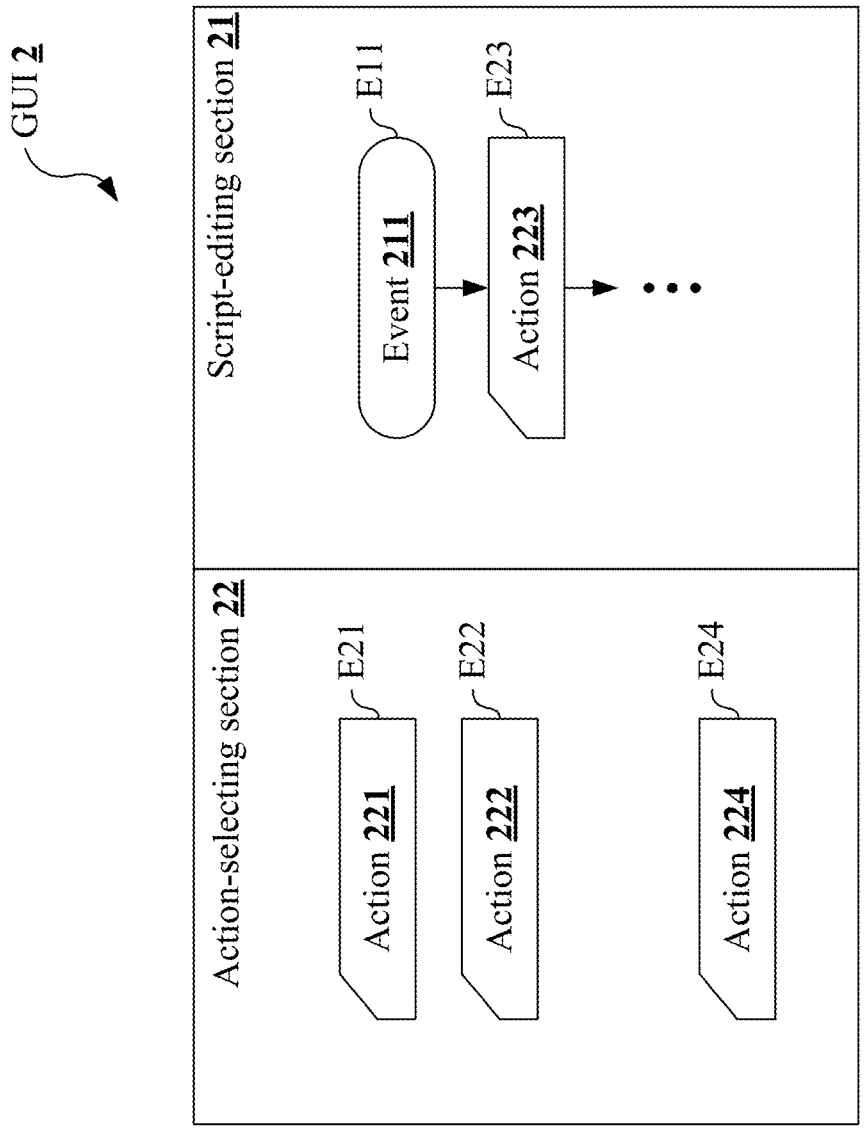

Next, how the RPA device 1 according to the embodiment of the present invention achieves multi-device robotic process automation will be described in detail through FIG. 1, FIG. 2A, and FIG. 2B. FIG. 2A and FIG. 2B depict the graphics user interface (GUI) created by the device for RPA according to one or more embodiments of the present invention. The contents shown in FIG. 2A and FIG. 2B are merely for explaining the embodiments of the present invention instead of limiting the present invention.

Referring to FIG. 1, FIG. 2A and FIG. 2B together, first, the communication interface 12 may continuously receive the current screenshot image P1 of the first device 121 and the current screenshot image P2 of the second device 122. The processor 13 may provide a GUI 2 so that the user 123 may operate in the GUI 2 through the communication interface 12. Specifically, as shown in FIG. 2A, the processor 13 may present the current screenshot image P1 of the first device 121 and the current screenshot image P2 of the second device 122 simultaneously on a first page of the GUI 2, and may present a script-editing section 21 and an action-selecting section 22 on a second page of the GUI 2, as shown in FIG. 2B. In some embodiments, the RPA device 1 may also present the GUI 2 through the communication interface 12 and a display so as to display the current screenshot image P1 and the current screenshot image P2 to the user.

Through the first page and the second page, the user 123 may provide an image-capturing command C1, an event-defining command C2, and an action-assigning command C3 to the RPA device 1, and the processor 13 may define events and the corresponding actions in a script 111 according to those commands. Specifically, first, the processor 13 may capture a target image (not shown in the drawings) from the current screenshot image P1 of the first device 121 displayed on the first page according to the image-capturing command C1 of the user 123 (for example, but not limited to: selecting a range by moving the cursor). Then, the processor 13 may define an event 211 in, for example, but not limited to, the first page as "the target image appears in the current screenshot image P1 of the first device 121" according to the event-defining command C2 of the user 123 (for example, but not limited to: select the "Define Event" option in a menu that appears on the screen when moving and clicking the cursor at a specific position), and then, the GUI element E11 representing the event 211 may be displayed in the script-editing section 21 in the second page. Subsequently, the processor 13 may designate at least one action corresponding to the event 211 as the action 223 according to the action-assigning command C3 of the user 123, thereby creating the script 111. The action-assigning command C3 may be, for example, but not limited to: selecting at least one of a plurality of GUI elements E21, E22, E23, E24 that respectively represent a plurality of actions 221, 222, 223, 224 through the cursor on the second page, and then selecting the "Assign Action" option in a menu that appears on the screen to associate the selected GUI element with the GUI element E11; or moving at least one of the GUI elements E21, E22, E23, E24 in the action-selection section 22 to the script-editing section 21 in the second page by means of drag and drop, so as to associate the selected element with the GUI element E11. In some embodiments, the processor 13 may also edit the details of the actions 221, 222, 223, and 224 through the first page and the second page.

The aforementioned target image may be a "partial" image that contains specific icons, numbers, characters and/or symbols. In addition, the aforementioned actions 221, 222, 223, and 224 may be actions formed by at least one operation performed on the mouse and/or keyboard of the second device 122, and the at least one operation may be, for example, but not limited to: right-click on the mouse, double-clicks on the left mouse button, moving the mouse cursor to a specific location, pressing keyboard keys, entering characters in the input field, switching between applications through keyboard shortcuts, selecting specific objects with the mouse cursor, and sliding the mouse cursor to perform drag and drop, and so on. In some embodiments, when the abovementioned action comprises performing an action for a specific position and/or a specific object (e.g., selecting a specific object with the mouse cursor, moving the mouse cursor to a specific position, inputting characters in the input field, or the like), the processor 13 may further analyze the current screenshot image P2 of the second device 122 to find the specific position and/or specific object in the current screenshot image P2, and perform said action for it.

For example, the target image may be a partial screenshot of a temperature field displayed by the first device 121, and may include a string indicating that the temperature of the device is higher than a specific temperature (e.g., text that writes "Current Temperature: 200 degrees Celsius"). Therefore, once the processor 13 determined that the target image has appeared in the current screenshot image P1 (i.e., the event 211 has occurred), which indicates that the temperature of the first device 121 has been higher than the specific temperature, therefore a corresponding cooling action should be executed for the first device 121. Accordingly, the action 223 corresponding to the event 211 may be detecting a "temperature control" option of the first device 121 in the current screenshot image P2 of the second device 122 (e.g., the second device 122 may be a temperature control device), and moving the cursor to said option, and clicking on said option.

For another example, the target image may include a warning icon indicating that the voltage of the first device 121 is too high. Therefore, when the processor 13 determines that the target image has appeared in the current screenshot image P1 of the first device 121 (i.e., the event 211 has occurred), it can perform a corresponding power-off action on the first device 121. Accordingly, the action 223 corresponding to the event 211 may be "inputting a corresponding power-off command in a command-input field shown in the current screenshot image P2 of the second device 122 (e.g., the second device may be a power-off device)".

For another example, the target image may include a text that writes "product abnormality detected". Therefore, when the processor 13 determined that the target image has appeared in the current screenshot image P1 of the first device 121 that belongs to the product examination device (i.e., the event 211 has occurred), it may adjust the manufacturing parameters of its product. Accordingly, the action 223 corresponding to the event 211 may be "moving the cursor to a parameter-input box shown in the current screenshot image P2, clicking on the parameter-input box, and inputting a specific parameter therein". More specifically, in some embodiments, the processor 13 may also analyze the current screenshot image P2 of the second device 122 that belongs to a production device, so as to find the parameter-input box in the current screenshot image P2. Then, the processor 13 may transmit the control signal Si to the second device 122 through the communication interface 12 to perform the actions of "moving the cursor, clicking on the parameter-input box, and inputting a specific parameter therein" to adjust the manufacturing parameters of its product.

In some embodiments, the processor 13 may analyze the current screenshot image P1 and the current screenshot image P2 through a deep learning model based on the convolutional neural network architecture, thereby detecting whether the above-mentioned target image appears in the current screenshot image P1, and detecting specific objects (e.g., the aforementioned parameter-input box, command-input field) in the current screenshot image P2. The deep learning model may be trained by the processor 13 or may be pre-trained by an external device and then input into the RPA device 1. It should be understood that those with ordinary skills in the art can adopt corresponding training data according to the type of the target image. In some embodiments, the processor 13 may also recognize the characters in the current screenshot image P1 and the current screenshot image P2 through techniques such as optical character recognition (OCR).

It should be understood that the content of the GUI 2 and the script 111 described above is only an example and not a limitation. In some other embodiments, the user 123 may define various events and assign a plurality of corresponding actions by continuously providing the aforementioned image-capturing command C1, the event-defining command C2 and the action-assigning command C3, and the communication interface 12 and the processor 13 may continuously perform the aforementioned operations in the first page and the second page according to said commands, thereby creating a script 111 with relatively more complex content.

After the script 111 is created, the processor 13 may execute the script 111 to determine whether each event recorded therein has occurred and execute corresponding actions accordingly, so as to achieve a process automation. Specifically, the processor 13 continuously analyzes the current screenshot image P1 of the first device 121 after executing the script 111 to determine whether the event 211 (i.e., the target image appears in the current screenshot image P1 of the first device 121) has occurred. When the processor 13 determined that the event 211 has occurred, the processor 13 may generate a control signal S1 corresponding to the action 223 according to the script 111, and the communication interface 12 may transmit the control signal S1 to the second device 122 so as to perform the action 223 for the second device 122, thereby achieving a cross-device RPA. In some embodiments, the control signal S1 may be an input signal when the mouse and/or keyboard of the second device 122 perform the action 223.

In some embodiments, the processor 13 may further define another event in the script 111 and assign another action corresponding to the other event. The other event may be that another target image appears in the current screenshot image P1 of the first device 121. Accordingly, the processor 13 may continuously analyze the current screenshot image P1 to determine whether the other event has occurred, and if so, it may generate another control signal corresponding to the other action according to the script 111, and transmit the other control signal to the first device 121 through the communication interface 12 so as to perform the other action on the first device 121. In some embodiments, similarly, the other event may be that another target image appears in the current screenshot image P2 of the second device 122. Accordingly, the processor 13 may continuously analyze the current screenshot image P2 to determine whether the other event has occurred, and if so, it may generate another control signal corresponding to the other action according to the script 111, and transmit the other control signal to the second device 122 through the communication interface 12 so as to perform the other action on the second device 122. In this way, the RPA device 1 is able to perform an RPA for a single device.

For example, when the processor 13 determines that a pattern of red dot has appeared on an icon of an application in the current screenshot image P1 of the first device 121 (e.g., a computer) (i.e., another event has occurred), which indicates that there is a new notification about the application in the system, so the processor 13 may generate a control signal corresponding to "clicking on the icon of the application with the mouse cursor" according to the script 111, and transmit the control signal to the first device 121 through the communication interface 12, such that the application icon with the pattern of red dot in the first device 121 be clicked, thereby displaying the new notification of the application.

To sum up, the RPA device 1 of the present disclosure creates a script 111 for the simultaneous operation of a plurality of devices. Therefore, the RPA device 1 is able to determine that the event 211 corresponding to the first device 121 has occurred in a non-invasive way of screen-shot-image analysis, and operate the second device 122 accordingly in response to the event 211, wherein the operation for the second device 122 is also based on non-invasive screenshot image analysis. In addition, the RPA device 1 of the present disclosure is also able to perform the RPA for a single device in some embodiments. In view of this, the RPA device 1 of the present disclosure has indeed achieved the RPA among multiple devices, thereby solving the aforementioned problems in the prior art.

Figure 3:
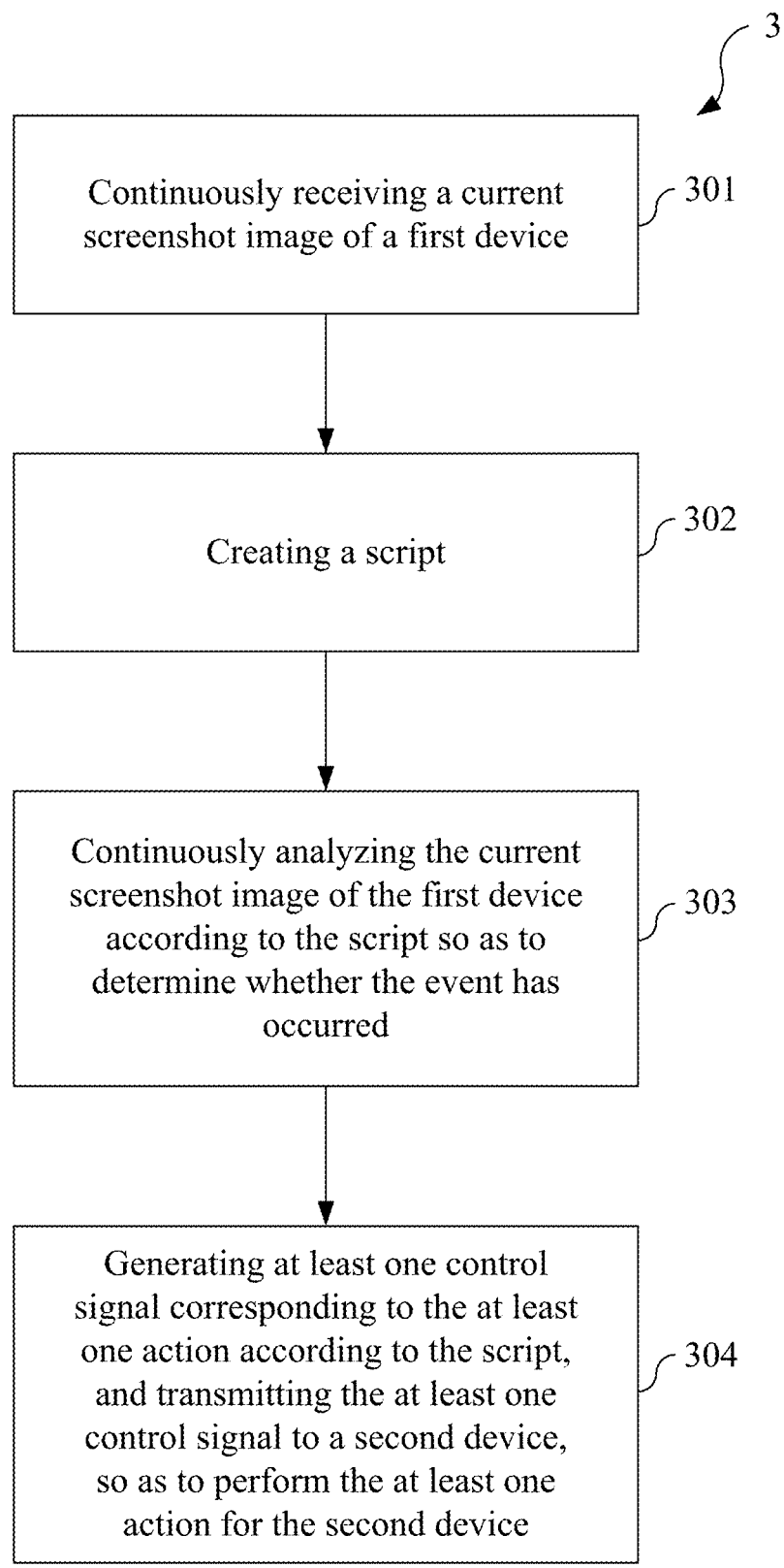
FIG. 3 depicts a method for RPA according to one or more embodiments of the present invention.

FIG. 3 depicts a method for RPA according to one or more embodiments of the present invention. The contents shown in FIG. 3 are merely for explaining the embodiments of the present invention instead of limiting the present invention.

Referring to FIG. 3, a method 3 for robotic process automation may be executed by an electronic computing device. The electronic computing device may store a script and at least one action, and the script may record at least an event corresponding to a first device, the at least one action corresponding to the event. The method 3 for robotic process automation may comprise steps as follows:

continuously receiving a current screenshot image of the first device (marked as 301);

creating the script (marked as 302);

continuously analyzing the current screenshot image of the first device according to the script so as to determine whether the event has occurred (marked as 303); and generating at least one control signal corresponding to the at least one action according to the script, and transmitting the at least one control signal to a second device, so as to perform the at least one action for the second device (marked as 304).

In some embodiments, the method 3 for robotic process automation may further comprising steps as follows:

receiving a current screenshot image of the second device continuously;

creating a graphical user interface; and presenting the current screenshot image of the first device and the current screenshot image of the second device in the graphical user interface simultaneously In some embodiments, regarding the method 3 for robotic process automation, the electronic computing device receives the current screenshot image of the first device from the first device and transmits the control signal to the second device through at least one input/output signal integrator.

In some embodiments, regarding the method 3 for robotic process automation, the at least one action corresponding to at least one operation of a mouse and/or a keyboard.

In some embodiments, the method 3 for robotic process automation may further comprising steps as follows:

capturing, according to an image-capturing command of a user, a target image from the current screenshot image of the first device presented in the graphical user interface;

defining, according to an event-defining command of the user, the event in the graphical user interface as that the target image appears in the current screenshot image of the first device; and assigning, according to an action-assigning command of the user, at least one action to the event, thereby creating the script.

In some embodiments, the method 3 for robotic process automation may further comprising steps as follows:

capturing, according to an image-capturing command of a user, a target image from the current screenshot image of the first device presented in the graphical user interface;

defining, according to an event-defining command of the user, the event in the graphical user interface as that the target image appears in the current screenshot image of the first device;

assigning, according to an action-assigning command of the user, at least one action to the event, thereby creating the script; and receiving the image-capturing command, the event-defining command, and the assigning-action command from the user.

Each embodiment of the method 3 for robotic process automation essentially corresponds to a certain embodiment of the RPA device 1. Therefore, even though not all of the embodiments of the method 3 for robotic process automation are not described in detail above, those with ordinary skills in the art can still directly understand the unspecified embodiments of the method 3 for robotic process automation according to the description of the RPA device 1 above.

The above-mentioned embodiments are only examples for describing the present invention, but not for limiting the present invention. Any other embodiments resulting from modification, change, adjustment, and integration of the above-mentioned embodiments, as long as being straightforward and derivable to those with ordinary skills in the art, are covered by the scope of the present invention. The scope of the present invention is subject to the claims.

What is claimed is:

1. A device for robotic process automation, comprising:
a storage, being configured to store a script, wherein the script records at least an event corresponding to a first device and at least one action corresponding to the event;
a communication interface, being coupled with the first device and a second device, and being configured to continuously receive a first current screenshot image of the first device from the first device and continuously receive a second current screenshot image of the second device from the second device, wherein the first current screenshot image is content being displayed by a first operating system of the first device and the second current screenshot image is content being displayed by a second operating system of the second device; and
a processor, being electrically connected with the storage and the communication interface, and being configured to:
create the script;
continuously analyze the first current screenshot image of the first device according to the script so as to determine whether the event has occurred; and
generate at least one control signal corresponding to the at least one action according to the script when determining that the event has occurred;
wherein the communication interface is further configured to transmit the at least one control signal to the second device so as to perform the at least one action on the second current screenshot image displayed on [[for]] the second device.

2. The device of claim 1, wherein the communication interface is further coupled to at least one input/output signal integrator, and the communication interface receives the first current screenshot image of the first device from the first device and transmits the at least one control signal to the second device through the at least one input/output signal integrator.

3. The device of claim 1, wherein the at least one action corresponds to at least one operation of a mouse and/or a keyboard.

4. The device of claim 1, wherein the processor is further configured to create a graphical user interface and present the first current screenshot image of the first device and the second current screenshot image of the second device in the graphical user interface simultaneously.

5. The device of claim 4, wherein the processor is further configured to:
capture, according to an image-capturing command of a user, a target image from the first current screenshot image of the first device presented in the graphical user interface;
define, according to an event-defining command of the user, the event in the graphical user interface as that the target image appears in the first current screenshot image of the first device; and
assign, according to an action-assigning command of the user, at least one action to the event, thereby creating the script.

6. The device of claim 5, wherein the communication interface is further configured to receive the image-capturing command, the event-defining command, and the action-assigning command from the user.

7. A method for robotic process automation, being executed by an electronic computing device, the electronic computing device storing a script and at least one action, the script recording at least an event corresponding to a first device, the at least one action corresponding to the event, the method comprising:
continuously receiving a first current screenshot image of the first device from the first device, wherein the first current screenshot image of the first device is content being displayed by a first operating system of the first device;
continuously receiving a second current screenshot image of the second device from the second device, wherein the second current screenshot image is content being displayed by a second operating system of the second device;
creating the script;

continuously analyzing the first current screenshot image of the first device according to the script so as to determine whether the event has occurred; and generating at least one control signal corresponding to the at least one action according to the script, and transmitting the at least one control signal to a second device, so as to perform the at least one action on the second current screenshot image displayed on the second device.

8. The method of claim 7, wherein the electronic computing device receives the first current screenshot image of the first device from the first device and transmits the at least one control signal to the second device through at least one input/output signal integrator.

9. The method of claim 7, wherein the at least one action corresponding to at least one operation of a mouse and/or a keyboard.

10. The method of claim 7, further comprising:

creating a graphical user interface; and presenting the first current screenshot image of the first device and the second current screenshot image of the second device in the graphical user interface simultaneously.

11. The method of claim 10, further comprising:

capturing, according to an image-capturing command of a user, a target image from the first current screenshot image of the first device presented in the graphical user interface;

defining, according to an event-defining command of the user, the event in the graphical user interface as that the target image appears in the first current screenshot image of the first device; and assigning, according to an action-assigning command of the user, at least one action to the event, thereby creating the script.

12. The method of claim 11, further comprising:

receiving the image-capturing command, the event-defining command, and the action-assigning command from the user.

* * * * *